United States Patent [19]
Filion

[11] Patent Number: 5,840,180
[45] Date of Patent: Nov. 24, 1998

[54] WATER FLOW SEGREGATING UNIT WITH ENDLESS SCREW

[75] Inventor: Gilles Filion, Kirkland, Canada

[73] Assignee: John Meunier Inc., Montreal, Canada

[21] Appl. No.: 869,284

[22] Filed: Jun. 2, 1997

[51] Int. Cl.$^6$ ............................ E02B 5/08; B01D 29/46; B01D 29/94; B01D 35/22
[52] U.S. Cl. ..................... 210/162; 210/155; 210/314; 210/415; 210/483
[58] Field of Search ............................ 28/162; 210/314, 210/413, 414, 415, 409, 155, 483

[56] References Cited

U.S. PATENT DOCUMENTS

| | | |
|---|---|---|
| 2,358,841 | 9/1944 | Walker . |
| 2,672,985 | 3/1954 | Nordell . |
| 2,910,181 | 10/1959 | Schade . |
| 4,473,470 | 9/1984 | Loutit . |
| 4,812,231 | 3/1989 | Wiesemann . |
| 5,034,122 | 7/1991 | Wiesemann . |
| 5,061,380 | 10/1991 | Stevenson . |
| 5,674,386 | 10/1997 | Filion . |

FOREIGN PATENT DOCUMENTS

| | | |
|---|---|---|
| 9303867 | 6/1993 | Germany . |
| 91/13672 | 9/1991 | WIPO . |
| 97/02081 | 1/1997 | WIPO . |

*Primary Examiner*—Thomas M. Lithgow
*Attorney, Agent, or Firm*—François Martineau

[57] ABSTRACT

The segregating unit of the invention is installed in a sewer pipe section having an upstream end and a downstream end, and a peripheral wall including a floor and a ceiling. The segregating unit comprises a bar screen having two straight panels composed of horizontally disposed, vertically stacked, spaced-apart bars. The two panels span the whole width and height of the pipe in a downstream convergent fashion, thus forming a V at their adjacent edges which open adjacent the pipe floor portion into an elongated, rigid, cylindrical sleeve member radially smaller than the pipe and upwardly inclined, extending through the pipe ceiling. The sleeve member comprises an output mouth located outside the pipe section, which opens into a storage box cart. An endless screw is coaxially installed inside the sleeve member and is driven into rotation by a motor. The upstream edge face of each bar is formed with a longitudinal channel, the cross-sectional area of which decreases from the upstream end to the downstream end of the bar. In use, the macro-particulate debris carried by the water flowing through the pipe section upstream end will hit the bar screen and travel therealong being assisted by the water film produced by the water accelerating in the bar channels and laterally over-flowing the same. The debris it reaches the merging edge of the two screen panels under the hydrodynamic propulsion of the water flow. Under the effect of gravity, the debris will be dragged down to the bottom of the pipe, where it will be driven by the water flow into the sleeve member. The endless screw will in turn drive the debris up the sleeve member, to be dispatched through the output mouth into the storage box cart. Holes are also provided on the sleeve member wall inside the pipe to drain the interior of the sleeve member from water.

3 Claims, 2 Drawing Sheets

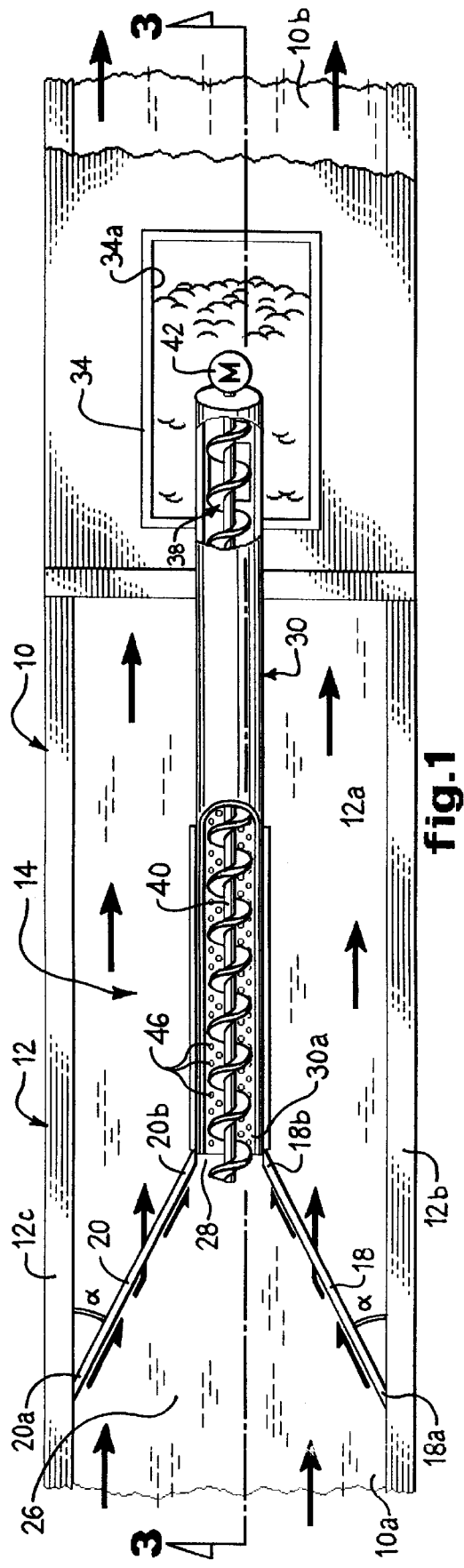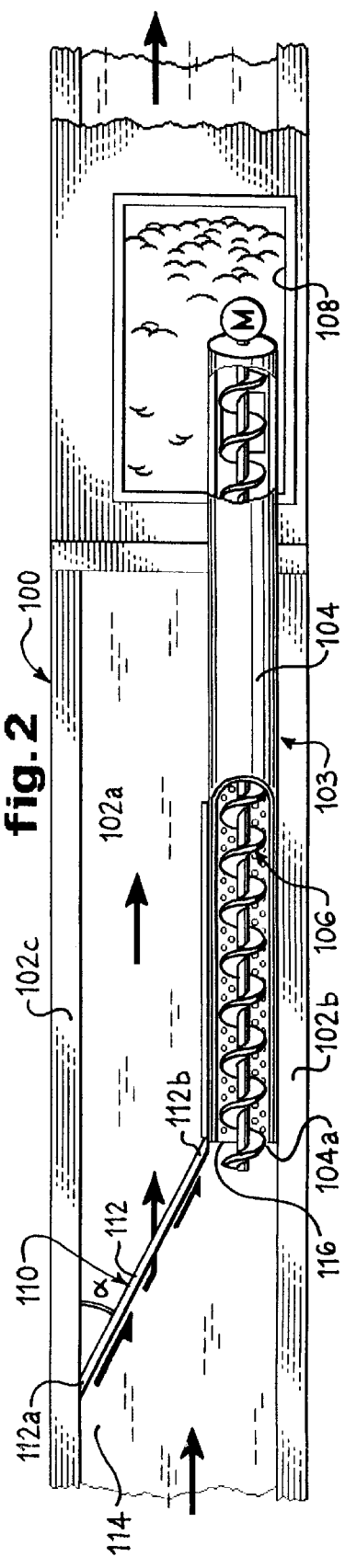

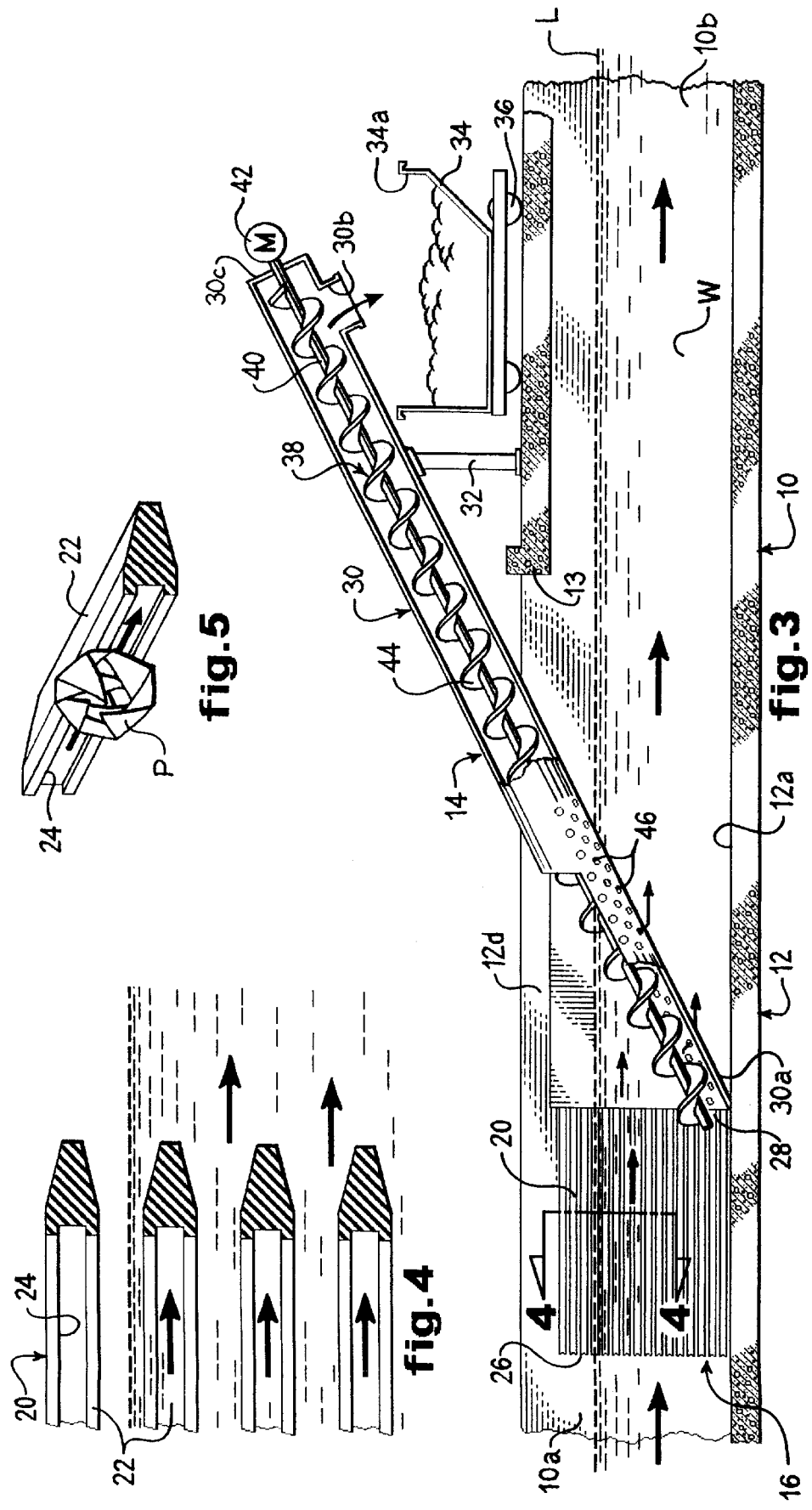

WATER FLOW SEGREGATING UNIT WITH ENDLESS SCREW

FIELD OF THE INVENTION

The present invention relates to an apparatus for screening water, and more particularly to a segregating unit having an endless screw for segregating macroparticulate debris carried by the water flowing in a water conduit.

BACKGROUND OF THE INVENTION

It is known to provide a bar screen in water ducts or the like, and more particularly in sewer conduits, for filtering out the macroparticles from the contaminated water and dispatching them at a suitable disposal site. The screened main portion of the water itself is conveyed back into the main river or water body in which it is dispatched.

The screening process is accomplished according to city regulations, which require the water that is thrown back into the main water body to be screened from all macroparticulate contaminants beyond a predetermined threshold diametral size. The macroparticles that are smaller than this predetermined dimension are allowed back into the main water body. Therefore, the screening apparatuses and devices are often designed to screen out the macroparticles of a certain minimum dimension.

U.S. Pat. No. 4,473,470 issued in 1984 to J. M. Loutit shows such an apparatus comprising a conical bar screen which is coaxially attached to the cylindrical peripheral wall of a water conduit and which converges towards the intake mouth of a discharge pipe. The unscreened water which flows through the water conduit is screened by the conical bar screen, the macroparticulate debris in the water being slidingly biased by the convergent conical shape of the bar screen under the hydrodynamic forces of the water flow, travelling thereon into the discharge pipe, which conveys the debris-filled water to a water treatment plant.

It can be seen that an apparatus such as the one disclosed in the Loutit patent requires two main steps in segregating the macroparticles carried by the water flow from the water:

1) the water is separated into two distinct flows: a first screened flow which returns into a natural water body such as a river, and a second flow which carries the screened debris to the water treatment plant; and 2) the second flow of debris-filled water is treated at the water treatment plant, i.e. the macroparticles are separated from the water flow to be dispatched in a suitable manner.

Thus, the water flow is filtered twice to segregate the macroparticles therefrom, although only the first segregation in the sewer conduit will be relevant as to the minimum dimension of the macroparticles which are to be screened from the water flow. Indeed, the bar screen has a determined inter-spacing between its bars, and any macroparticles that are smaller than this inter-spacing will most probably pass through the bar screen and be carried by the water into the main water body. Whatever the screening/filtering which occurs at the water treatment plant, no or very few macroparticles that are smaller than the screen bars inter-spacing will be screened from the water flow since these will never reach the water treatment plant. The first screening is accomplished to segregate the macroparticles having the said minimum dimension, and the screening/filtering occurring at the water treatment plant removes these macroparticles from the water. Consequently, two segregating operations are accomplished to screen the particles of a same dimension from the water flow.

Another disadvantage of the Loutit patent is that the intake mouth of the discharge pipe is located coaxially in the main conduit, thus well above the floor portion of the conduit. This does not constitute a problem when the water flow fills the main conduit at least up to the discharge pipe, but under dry time conditions, i.e. when no rain is falling and the sewer conduits are not subjected to important water flows, the water level may not reach the discharge pipe, and it is likely that the debris would then accumulate in the lower portion of the bar screen and clog it.

OBJECTS OF THE INVENTION

It is the general object of the present invention to improve upon existing screening apparatuses to be used in water sewer conduits or the like.

More particularly, it is an object of this invention to provide a water segregating unit for water conduits, which will segregate in situ the macroparticles from the water flowing therein.

It is an important object of this invention that the segregating unit be effective under almost any water flow rates in the pipe in which it is installed, even during dry time conditions in which very little water flows through the pipe.

SUMMARY OF THE INVENTION

In accordance with the objects of the invention, there is disclosed a sewer pipe waste segregating unit in combination with a sewer pipe, said unit comprising: (a) a generally planar and vertical bar screen located within and diagonally across inside the sewer pipe for segregating macroparticulate contaminants in the waste water flowing through the bar screen, said bar screen comprising a plurality of parallel spaced bars each having an upstream edge face and upstream and downstream ends, a waste outlet aperture at said downstream ends of said bars and at the bottom of said sewer pipe; and (c) an elongated conveyer member extending upwardly through the sewer pipe and therebeyond and defining a bottom end, operatively connected to said bar screen waste outlet aperture, and a top discharge end spaced above said sewer pipe; wherein said conveyor member carries macroparticulate contaminants intercepted by said bar screen from said bar screen waste outlet aperture to said conveyor member top discharge end.

Each said bar is formed with a longitudinal channel in the upstream edge face thereof. Each said channel has a cross-sectional area which decreases from said upstream end to said downstream end of the bar.

Advantageously, said conveyor member consists of a cylindrical tube in which rotates an endless screw under power from power means; and further including a plurality of weep holes, made in the portion of conveyor tube located inside the sewer pipe and facing downwardly; the diametral size of each weep hole corresponding to that of the inter-spacing between any two successive said spaced bars of the bar screen; wherein said weep holes provide water drainage means for progressive release of water from said conveyor tube into the sewer pipe, upon macroparticulate waste contaminant being conveyed toward the conveyor top discharge end.

Profitably, a second bar screen would be added, forming with the first-mentioned bar screen a funnel assembly of v-shape in top plan view, a single waste outlet aperture being defined at the merger of the bottom of the downstream ends of both said bar screens.

DESCRIPTION OF THE DRAWINGS

In the annexed drawings:

FIGS. 1 and 2 are top plan views of a first and a second embodiment, respectively, of the segregating unit according to the invention, with the ceiling portion of the water pipe being removed for clarity of the views, and illustrating the endless screw sleeve as partly broken to show the endless screw therein;

FIG. 3 is a side cross-sectional view taken along line 3—3 of FIG. 1, again illustrating the upwardly extending endless screw sleeve as partly broken to show the endless screw therein that escape at its downstream end portion transversely from the sewer conduit;

FIG. 4 is a cross-sectional view of a bar screen panel, at an enlarged scale, taken along line 4—4 of FIG. 3; and FIG. 5 is a partial perspective view of one bar of the bar screen of the segregating unit, suggesting the sliding displacement of a hydrodynamically propelled macroparticle thereon.

DETAILED DESCRIPTION OF THE PREFERRED EMBODIMENTS

FIGS. 1 and 3 show a section of a sewer conduit or pipe 10 which defines an upstream and a downstream end 10a, 10b, respectively, with contaminated water being destined to flow through pipe 10 from upstream end 10a to downstream end 10b. Pipe 10 is shown to be of rectangular cross-section, but it may of course be cylindrical or have any other suitable shape. Pipe 10 comprises a peripheral wall 12 having a floor portion 12a which is defined by the lower portion of pipe 10, over which the water is destined to flow. Peripheral wall 12 further has a pair of lateral side walls 12b, 12c and a ceiling portion 12d.

A segregating unit 14 according to a first embodiment of the invention comprises a bar screen 16 having a pair of generally planar and vertical screen panels 18, 20, which are diagonally disposed and converging across pipe 10 in the direction of the water flow indicated by the arrows. As shown in FIGS. 4 and 5, bar screen panel 20 is made from a number of parallel, horizontally disposed, vertically stacked and equally spaced-apart bars 22 each having a longitudinal channel or groove 24 made in the upstream edge face of the bar 22, for reasons that will be explained hereinafter, the grooves 24 facing towards the center of pipe 10. Although only panel 20 is shown in FIG. 4, it is understood that panel 18 is symmetrically identical, relative to the pipe 10 longitudinal axis.

Screen panels 18, 20 are substantially rectangular, and are fixedly anchored along their upstream edges 18a, 20a to a respective side wall 12c, 12d of pipe 10. Each panel 18, 20 spans the whole height of pipe 10, i.e. from floor portion 12a to ceiling portion 12d. Panels 18, 20 together span the whole width of pipe section 10, forming a V so as to converge towards the pipe downstream end 10b and towards the pipe 10 central longitudinal axis, so as to merge with one another at the centre of pipe 10. Thus, bar screen 16 forms a main convergent body which has an input mouth 26 defined by the plane linking its upstream edges 18a, 20a which are attached to the pipe lateral side walls 12b, 12c. The bar screen 16 main body further has an output mouth 28, which consists of a small circular opening in panels 18, 20 at their merging downstream edges 18b, 20b, the output mouth 28 being located adjacent floor portion 12a.

An elongated, cylindrical, hollow, rigid sleeve member 30 is provided, extending transversely from sewer pipe 10, through an aperture 13 in its top wall 12d, and upwardly therebeyond, in a direction generally intermediate the radial and longitudinal axes of pipe 10. Sleeve member 30 has an axial, endwise intake opening 30a attached to output mouth 28, the latter registering therewith and being correctly sized for a complementary fit thereon. Sleeve member 30 upwardly extends through the pipe ceiling portion 12d and is supported in an inclined position by a support rod 32. A radially oriented outlet opening 30b is located transversely of an upper end portion opposite intake opening 30a, on the cylindrical peripheral wall of sleeve member 30. Outlet opening 30b is fluidingly connected to storage means in the form of a storage box cart 34, adapted to fit therebeneath. Although the fluid connection is shown in the drawings as being simply a question of the sleeve member outlet opening 30b overlying the open receiving top mouth 34a of storage box cart 34, it is understood that flexible pipes or other suitable fluid connections could be mounted to outlet port 30b.

Preferably, as shown in FIG. 3, storage box cart 34 includes a set of wheels 36 for allowing easy displacement thereof, especially when cart 34 is fully loaded, as will be explained hereinafter.

Sleeve member 30 further comprises an endless screw 38 coaxially located therein, and which extends from intake opening 30a to beyond outlet opening 30b. The screw driving shaft 40 is rotatably connected to a driving motor 42, mounted to the top end 30c of tube 30, for rotating endless screw 38. The helicoidal fin 44 of screw 38 radially extends out to the inner wall of sleeve member 30, though without quite engaging it.

The portion of sleeve member 30 located inside sewer pipe 10 comprises water drainage means located between the sleeve intake opening 30a and the pipe aperture 13. These water drainage means are preferably in the form of a plurality of holes 46 in the cylindrical wall of sleeve member 30 which are located on a portion of sleeve member 30 which is entirely enclosed inside pipe 10 and which is downwardly oriented. The dimension of holes 46 should be smaller than the spacing between two successive bars 22 of bar screen 16.

In use, the contaminated water W flows through sewer pipe section 10 and fills it up to a certain variable level L (FIG. 3). The contaminated water coming through the upstream end 10a of pipe 10 carries a certain amount of macroparticulate debris. When the water flows through bar screen 16, the macroparticles having a dimension larger than the spacing between two successive screen bars 22 will hit the screen bars and be biased thereby towards the radially inward merging point of the two screen panels 18, 20, since the macroparticles P are hydrodynamically propelled along the bars 22 and slidingly travelling thereon, as suggested in FIG. 5. As already detailed in applicant's U.S. Pat. No. 5,674,386 dated Oct. 7, 1997 for SELF-CLEANING BAR SCREEN FOR STORMWATER AND THE LIKE LARGE WATER VOLUMES, the bar grooves 24 will help prevent the debris from sticking on bar screen 16 and clogging it. Indeed, groove 24 which faces upstream allows passage of a water film between the bottom of groove 24 and macroparticles P, which will effectively help prevent macroparticles P from sticking to the screen bars 22. The cross-section of groove 24 decreases from the upstream end of each, bar 22 to its downstream end, as in U.S. Pat. No. 5,624,386 to maintain the above noted water film despite the fact that the waste water velocity in grooves 24 is greater at the downstream end than at the upstream end of each bar 22.

Through the effect of gravity, the macroparticles will eventually be dragged downward towards floor portion 12a, and the water flow will then carry the macroparticles into the sleeve member intake mouth 30a. The rotating endless screw 38 will move the macroparticles progressively upwardly along sleeve member 30, towards top discharge chute opening 30b where the macroparticles will be discharged into storage box cart 34. obviously, several carts 34 can be successively provided as the preceding carts have been filled with waste material, and the filled carts are sequentially downloaded into a larger refuse receiving area or processing plant, wherein the endless screw 38 can operate under power from the end motor in a continuous fashion.

Wheels 36 help in moving cart 34 over ground, especially when fully loaded with macroparticles.

As can be seen in FIGS. 1 and 3, endless screw 38 axially extends slightly beyond sleeve member intake mouth 30a. This allows screw 38 to brush the pipe floor portion 12a with its extremity, thus helping to drive the debris just outside intake mouth 30a, and into sleeve member 30.

Also, endless screw 38 can cut longer macroparticulate debris when these partially engage into the sleeve member 30, due to the shearing effect applied by the rotating screw on the debris trapped between it and the sleeve member intake mouth 30a.

The purpose of weep holes 46 is to allow sleeve member 30 to drain itself from the water entering it through intake mouth 30a. Indeed, if there were no holes 46 in sleeve member 30, it would be possible that the water be carried along with the macroparticles all the way up sleeve member 30 and into box cart 34, especially if there are a lot of macroparticles driven by screw 38 inside sleeve member 30: the macroparticles could partially seal the space between the endless screw helicoidal fin 44 and the sleeve member cylindrical wall, effectively at least partially preventing the water from seeping around screw 38. The water could thus be carried up sleeve member 30 with the macroparticulate debris by endless screw 38 and be discharged into storage box cart 34, the water and the debris gradually filling box cart 34, and consequently requiring a much more frequent maintenance thereof, for emptying it. With drain holes 46, the water is allowed to flow out from sleeve member 30 and back in pipe 10, before reaching the top end 30c of conveyor tube 30.

The size of weep holes 46 should be smaller than the through-openings defined between two successive screen bars 20, for preventing the macroparticles travelling in sleeve member 30 to escape therethrough, while allowing the water to flow therethrough.

The acute angle α (FIG. 1) between the pipe side walls 12b, 12c and the screen panels 18, 20 is preferably of approximately 30°, although any angle between 15° and 45° would be acceptable. An angle smaller than 15° would require needlessly long panels, and an angle above 45° could hinder the sliding displacement of the debris along the screen bars 22 due to a greater frictional force between the screen bars and the debris resulting from this larger angle, and thus could promote clogging of the screen bars 22.

A second embodiment of the invention is shown in FIG. 2. This second embodiment is very similar to the first embodiment, except as will be noted hereinafter.

The sewer pipe section 100 is of rectangular cross-section, and comprises a peripheral wall 102 having a floor portion 102a, a pair of lateral side walls 102b, 102c, and a ceiling portion (not shown). A segregating unit 103 according to the second embodiment of the invention comprises a sleeve member 104, similar to sleeve member 30 of the first embodiment, having a coaxial, interior endless screw 106 and being installed adjacent side wall 102b of pipe 100. Sleeve member 104 is upwardly inclined so as to extend through and beyond the pipe ceiling portion, and discharges its macroparticulate debris into storage means, in the form of a refuse loading box cart 108.

In this second embodiment, a bar screen 110 is formed by a single generally vertical, planar screen panel 112, diagonally extending across sewer pipe 100. Panel 112 is similar to panels 18 or 20 of the first embodiment, i.e. with horizontally disposed, parallel, vertically stacked and equally spaced-apart grooved bars. The groove or channel in each bar is as groove 24 of FIG. 5. As shown in FIG. 2, the acute angle α between panel member 112 and pipe side wall 102c is similar to the one between the panels 18, 20 of the first embodiment with their respective side wall 12b, 12c, i.e. that α is preferably approximately 30°, though any angle between 15° and 45° is acceptable.

The bar screen input mouth 114 is defined in this embodiment as the transversal plane registering with the bar screen attached edge 112a and its output mouth 116 is again a rather small circular opening located at the bar screen edge 112b opposite attached edge 112a, adjacent side wall 102b. Edge 112a is attached to side wall 102c, while edge 112b is attached to side wall 102b all along its length, except at output mouth 116. Again, the sleeve member intake mouth 104a corresponds and registers with bar screen output mouth 116, so that all the debris carried by the water flowing into pipe 100 will either hit bar screen 110 or will enter sleeve member 104.

The difference between this second embodiment and the first embodiment is that bar screen 110 comprises a single screen panel 112. In any event, as can be seen in FIG. 2, screen panel 112 converges towards pipe side wall 102b, the bar screen main body thus being still convergent towards its output mouth 116, so that the debris will be driven therein.

An important and advantageous aspect of the present invention, both for the first and the second embodiments, is that the sleeve member intake mouth 30a, 104a is located adjacent the pipe floor portion 12a, 102a. This allows the water flow to reach the sleeve member intake mouth 30a, 104a, even if the water level L is very low, for example during dry time conditions, i.e. when the sewer pipe 10, 100 has very little water flowing therein. Thus, segregating unit 14, 103 will be effective under almost any water flow rates in pipe section 10, 100.

Another important advantage of the segregating unit according to the present invention is that only a single-step segregation is needed to obtain:

1) a screened water flow that can be conveyed to the main water body in which it is destined to be dispatched; and
2) macroparticulate debris entirely separated from the water.

Thus, no conveying means such as pipes or pumps are required to convey a debris-filled water flow to a water treatment plant, as with many prior art devices. The macroparticles are segregated in situ, and temporarily stored in the storage box cart.

Yet another advantage of the present invention is that it can be retro-fitted into existing water pipes with little modifications brought thereto. Indeed, only an opening has to be made through the pipe ceiling portion to accommodate the through-passage of the sleeve member, and to allow installation of the segregating unit.

It is also preferable to provide a maintenance access door (not shown) in the pipe ceiling portion, to allow a maintenance crew to gain access whenever required inside the pipe, upstream relative to the bar screen, to remove larger debris that would be clogging the bar screen.

It is understood that modifications to the present invention that do not reach beyond the scope of the present invention, are considered to be included therein.

For example, the water drainage means could consist of small flexible or rigid pipes sealingly connected to the sleeve member and to a pressure pump, to thereby drain the sleeve member from the undesirable water accumulation therein by means of the pump sucking the water out of the sleeve member and dispatching it back into the main pipe. Of course, this alternative is much more costly than the one presented with the first and second embodiments.

Also, the pipe section could be cylindrical instead of having a rectangular cross-section, the sleeve member intake mouth then being located on the lowermost portion of the peripheral wall. The first embodiment of FIG. 1 would consequently best show the pipe and segregating unit in such a situation, since the sleeve member intake mouth would be centred relative to the pipe, so as to be located on the lowermost portion of its peripheral wall. The screen bar would then have to be of a complementary shape relative to the pipe peripheral wall, i.e. each panel would be half-elliptic.

It is also envisioned that the box cart be located elsewhere than on the sewer pipe ceiling portion. Indeed, it would be possible for the box car to be alternately located on one lateral side or the other of the sewer pipe, with the inclined conveyor tube extending through the corresponding pipe side wall, the cart then being installed on a platform sized to accommodate it.

The storage means could also be different from a box cart, for example a large storage tank, located on one side or the other of the pipe, and buried underground. This larger tank could be emptied at much longer time intervals, as with a septic tank for example. However, the humid debris would then remain in the tank much longer than with the smaller storage cart box, which must be emptied more regularly; for preventing foul odours originating from these humid and stagnant debris from polluting the ambient air, the fluid connection of this larger tank with the sleeve member outlet opening would preferably be a pipe sealingly and fluidingly linking the sleeve member to the enclosed tank.

In any event, it is important that the sleeve member outlet mouth be located well above the sleeve member intake opening, to allow the macroparticulate debris to rise therein while the water drainage means drain the water therefrom.

It is also envisioned that an alternate conveyor member be used instead of an endless screw and cylindrical sleeve assembly. Any known type of suitable conveyor, which is known to the person skilled in the art, may be used instead of the screw and sleeve assembly.

As known in the art, there would also preferably be provided means for allowing overflow water to pass directly towards pipe downstream end 10b without being previously screened, during exceptional storm water conditions, and in case the bar screen is partially clogged. These means could be provided in the form of an opening in the pipe ceiling portion located above the bar screen and extending beyond its input mouth on one side and beyond its output mouth on the other side. In the case where the bar screen would become partially clogged, the water could build up at the pipe section upstream end and vertically overflow over the bar screen through the opening in the pipe ceiling portion, to then flow back into the pipe beyond the bar screen and be conveyed into the river or the like water body. It is understood that the water overflowing the bar screen would not be screened from its macroparticulate debris, but this is generally accepted by city regulations under exceptionally heavy water storm conditions. By providing such overflow control means, undesirable backwash of the contaminated water into the sewer pipe back towards its upstream end can be prevented.

I claim:

1. A combination of a sewer pipe waste segregating unit and sewer pipe comprising:

(a) a generally planar and vertical bar screen located within and diagonally across said sewer pipe for segregating macroparticulate contaminants in waste water flowing through the bar screen in said sewer pipe, and said bar screen comprising a plurality of parallel spaced bars each having upstream and downstream ends, and an upstream edge face, a waste outlet aperture defined at said downstream ends of the bars and at the bottom of said sewer pipe; and (b) an elongated conveyor member, extending upwardly through the sewer pipe and therebeyond and defining a bottom end operatively connected to said bar screen waste outlet aperture and a top discharge end spaced above said sewer pipe;

wherein said conveyor member carries macroparticulate contaminants intercepted by said bar screen from said bar screen waste outlet aperture to said conveyor member top discharge end; each bar of said bar screen being formed with a longitudinal channel in said upstream edge face, each said channel having a cross-sectional area which decreases from said upstream end to said downstream end of said bar.

2. The combination as defined in claim 1, wherein said conveyor member consists of a cylindrical conveyor tube in which rotates an endless screw under power from power means; and further including a plurality of weep holes, made in the portion of conveyor tube located inside the sewer pipe and facing downwardly; the diametral size of each weep hole corresponding to that of the interspacing between any two successive said spaced bars of the bar screen;

wherein said weep holes providing water drainage means for progressive release of water from said conveyor tube into the sewer pipe, upon macroparticulate waste contaminant being conveyed toward said conveyor member top discharge end.

3. The combination as defined in claim 1, further including a second bar screen forming with the first-mentioned bar screen a funnel assembly of v-shape in top plan view, a single waste outlet aperture being defined at said downstream ends of the bars at the bottom of both said bar screens.

* * * * *